(12) United States Patent
Newcomb et al.

(10) Patent No.: US 10,507,776 B2
(45) Date of Patent: Dec. 17, 2019

(54) FIBER-REINFORCED COMPOSITE BUMPER BEAM AND CRUSH MEMBERS

(71) Applicant: GM Global Technology Operations LLC, Detroit, MI (US)

(72) Inventors: Bradley A. Newcomb, Troy, MI (US); Hamid G. Kia, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/782,307

(22) Filed: Oct. 12, 2017

(65) Prior Publication Data

US 2019/0111872 A1    Apr. 18, 2019

(51) Int. Cl.
*B60R 19/03* (2006.01)
*B60R 19/18* (2006.01)
*B60R 19/34* (2006.01)

(52) U.S. Cl.
CPC .............. *B60R 19/03* (2013.01); *B60R 19/18* (2013.01); *B60R 19/34* (2013.01); *B60R 2019/182* (2013.01); *B60R 2019/1853* (2013.01)

(58) Field of Classification Search
CPC ......... B60R 19/03; B60R 19/04; B60R 19/26; B60R 19/34; B60R 19/1853;

(Continued)

(56) References Cited

U.S. PATENT DOCUMENTS

| 4,402,537 A | * | 9/1983 | Gallitzendorfer | ....... B60R 19/04 293/149 |
| 5,967,592 A | * | 10/1999 | Freeman | ............... B29C 70/443 293/120 |

(Continued)

FOREIGN PATENT DOCUMENTS

| CN | 109649310 A | 4/2019 |
| DE | 4232870 | * 3/1994 ............. B60R 19/18 |

(Continued)

OTHER PUBLICATIONS

Computer translation of WO 2016-113477 (Year: 2016).*

(Continued)

*Primary Examiner* — Gregory A Blankenship
(74) *Attorney, Agent, or Firm* — Harness, Dickey & Pierce, P.L.C.

(57) ABSTRACT

An energy-absorbing structure includes first and second components. The first component includes a polymer and a plurality of reinforcing fibers disposed therein. The first component includes first bumper and crush member portions respectively defined by first and second walls. The second wall projects from and is integrally formed with the second wall. At least some of the fibers continuously extend between the first and second walls. The second component includes the polymer and a plurality of reinforcing fibers. The second component includes second bumper and crush member portions respectively defined by third and fourth walls. The fourth wall projects from and is integrally formed with the third wall. At least some of the fibers continuously extend between the third and fourth walls. The first and second components are joined. The first and third walls cooperate to define a bumper. The second and fourth walls cooperate to define a crush member.

20 Claims, 12 Drawing Sheets

(58) Field of Classification Search
CPC ............... B60R 19/1833; B60R 19/18; B60R 2019/1853; B60R 2019/1833
See application file for complete search history.

(56) References Cited

U.S. PATENT DOCUMENTS

| | | | |
|---|---|---|---|
| 6,286,879 B1* | 9/2001 | Haque | B60R 19/03 293/102 |
| 7,819,462 B1 | 10/2010 | Owens | |
| 8,033,592 B2 | 10/2011 | Hsu et al. | |
| 8,109,492 B2 | 2/2012 | Winocur | |
| 8,961,724 B2 | 2/2015 | Polewarczyk et al. | |
| 9,227,673 B2 | 1/2016 | Berger et al. | |
| 9,598,033 B1* | 3/2017 | Berger | B60R 19/03 |
| 10,125,809 B2 | 11/2018 | Coppola et al. | |
| 10,132,270 B2 | 11/2018 | Coppola et al. | |
| 2007/0176440 A1* | 8/2007 | Henseleit | B60R 19/18 293/102 |
| 2011/0169283 A1* | 7/2011 | Salin | B60R 19/18 293/133 |
| 2012/0141764 A1* | 6/2012 | Lee | B60R 19/03 428/297.4 |
| 2013/0119683 A1* | 5/2013 | Blumel | B21D 53/88 293/133 |
| 2013/0257069 A1* | 10/2013 | Roberts | B60R 19/22 293/120 |
| 2014/0333077 A1* | 11/2014 | Kil | B60R 19/03 293/132 |
| 2015/0015006 A1* | 1/2015 | Yabu | B60R 19/03 293/120 |
| 2015/0343717 A1* | 12/2015 | Graf | B29C 70/48 264/152 |
| 2016/0001722 A1* | 1/2016 | Nickel | B60R 19/18 293/120 |
| 2016/0046248 A1* | 2/2016 | Fuerst | B60R 19/18 293/121 |
| 2016/0075080 A1* | 3/2016 | Iwano | B60R 19/023 293/120 |
| 2016/0121827 A1* | 5/2016 | Yabu | B60R 19/18 293/120 |
| 2016/0159300 A1* | 6/2016 | Matecki | B23P 15/00 293/120 |
| 2016/0264082 A1 | 9/2016 | Berger et al. | |
| 2016/0264083 A1* | 9/2016 | Ishitsuka | B60R 19/34 |
| 2016/0272136 A1* | 9/2016 | Park | B60R 19/03 |
| 2016/0355635 A1* | 12/2016 | Aspin | C08J 5/04 |
| 2017/0036624 A1* | 2/2017 | Yabu | B60R 19/03 |
| 2017/0080884 A1* | 3/2017 | Kitakata | B60R 19/03 |
| 2017/0106917 A1* | 4/2017 | Mashio | B60R 19/023 |
| 2017/0144618 A1* | 5/2017 | Martini | B60R 19/03 |
| 2017/0144619 A1* | 5/2017 | Shamoto | B60R 19/04 |
| 2017/0203707 A1* | 7/2017 | Fuerst | B60R 19/34 |
| 2017/0305220 A1* | 10/2017 | Virupaksha | B60R 19/34 |
| 2017/0361794 A1* | 12/2017 | Holderried | B60R 19/03 |
| 2018/0029316 A1 | 2/2018 | Coppola et al. | |
| 2018/0030922 A1 | 2/2018 | Kia et al. | |
| 2018/0030924 A1 | 2/2018 | Coppola et al. | |
| 2018/0037179 A1* | 2/2018 | Steinebach | B22D 25/02 |
| 2018/0117808 A1* | 5/2018 | Cho | B60R 19/18 |
| 2018/0162303 A1 | 6/2018 | Aitharaju et al. | |
| 2018/0245681 A1 | 8/2018 | Newcomb et al. | |
| 2019/0111872 A1* | 4/2019 | Newcomb | B60R 19/03 |

FOREIGN PATENT DOCUMENTS

| | | | |
|---|---|---|---|
| DE | 102018125169 A1 | 4/2019 | |
| WO | WO 2016/113477 | * 7/2016 | ............ B60R 19/18 |

OTHER PUBLICATIONS

Anthony M. Coppola et al.; U.S. Appl. No. 15/225,051, filed Aug. 1, 2016 entitled "Methods of Joining Components in Vehicle Assemblies"; 55 pages.

Anthony M. Coppola et al.; U.S. Appl. No. 15/225,080, filed Aug. 1, 2016 entitled "Crankshaft Assemblies and Method of Manufacturing the Same"; 52 pages.

Anthony M. Coppola et al.; U.S. Appl. No. 15/225,066, filed Aug. 1, 2016 entitled "Engine Assemblies and Mehtods of Manufacturing the Same"; 47 pages.

Anthony M. Coppola et al.; U.S. Appl. No. 15/225,037, filed Aug. 1, 2016 entitled "Mehtods of Manufacturing Vehicle Assemblies"; 52 pages.

Bradley A. Newcomb et al.; U.S. Appl. No. 15/442,341, filed Feb. 27, 2017 entitled "Composite Axle Housing and Methods of Manufacturing Thereof"; 41 pages.

Hamid G. Kia et al.; U.S. Appl. No. 15/225,025, filed Aug. 1, 2016 entitled "Polymeric Composite Engine Assembly and Methods of Heating and Cooling Said Assembly"; 42 pages.

Venkateshwar R. Aitharaju et al.; U.S. Appl. No. 15/373,639, filed Dec. 9, 2016 entitled "Cap Design for Fiber-Reinforced Composite Crush Members"; 41 pages.

* cited by examiner

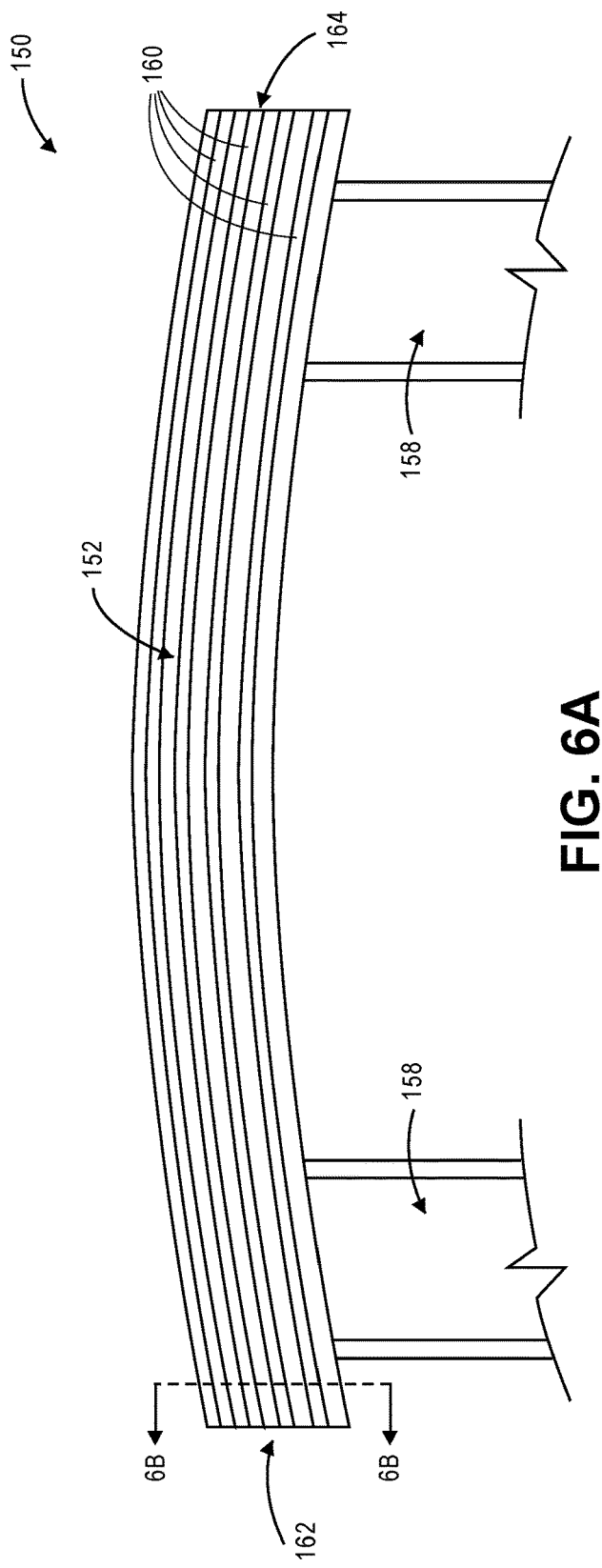
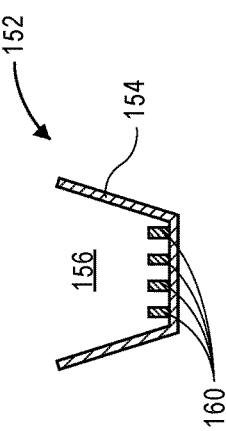
FIG. 6A
FIG. 6B

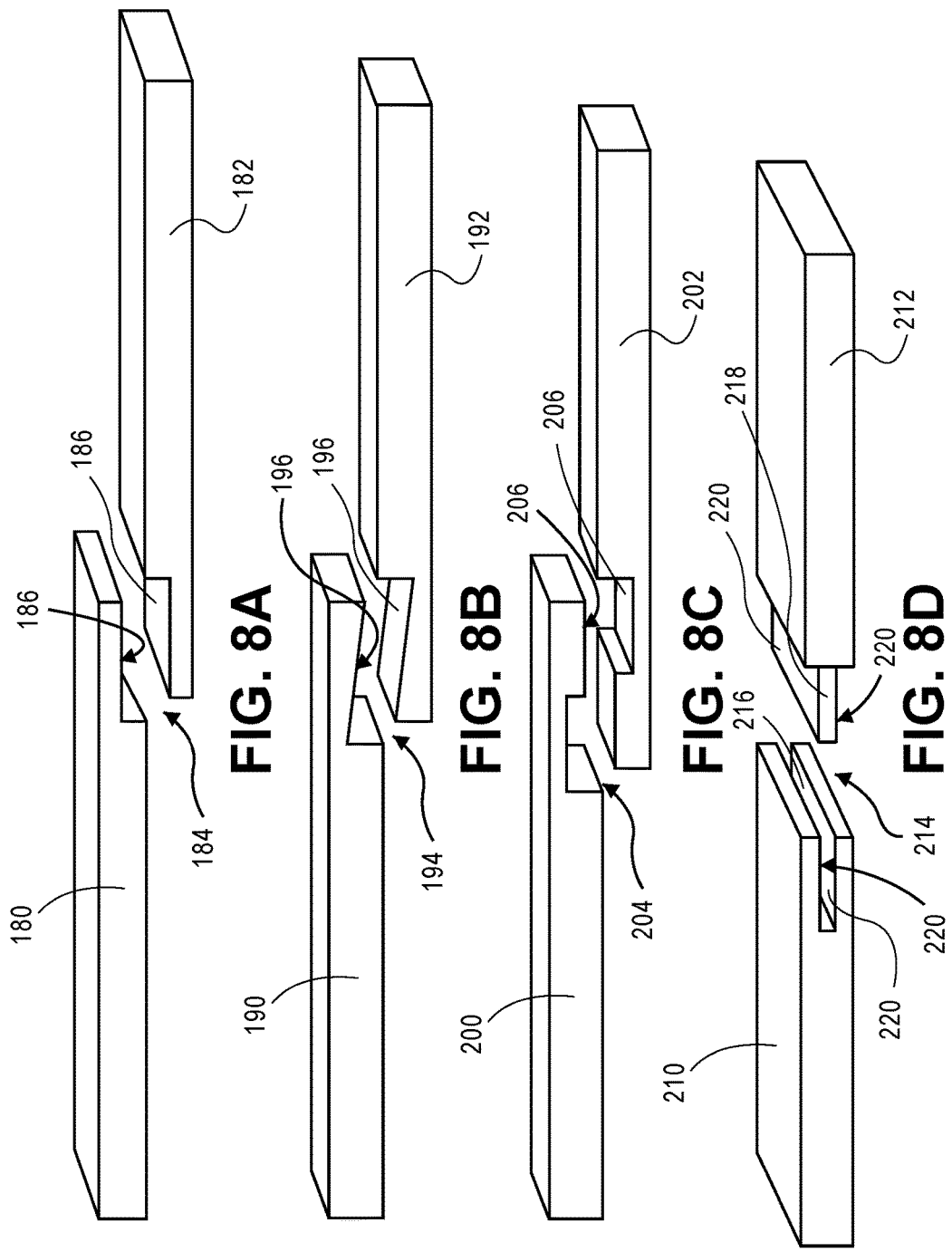

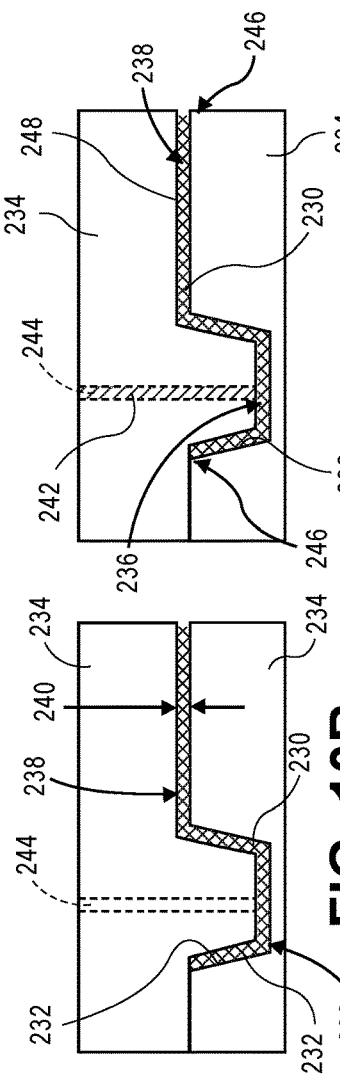
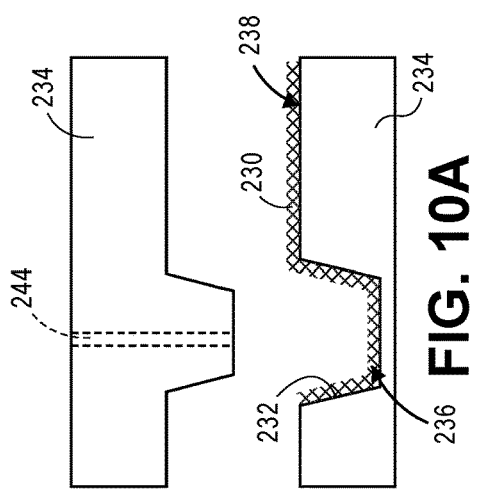
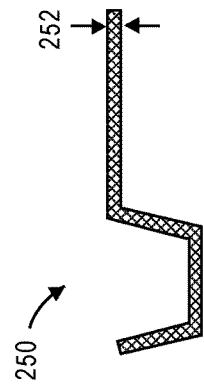
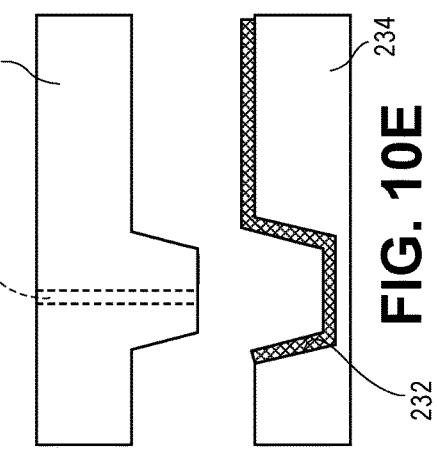
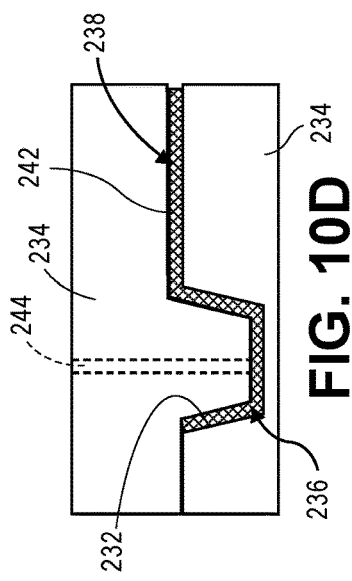

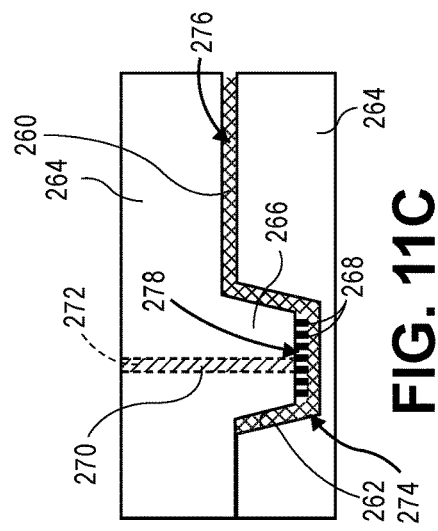
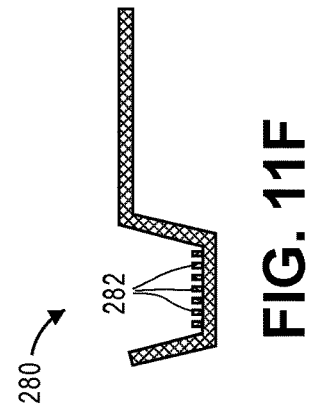
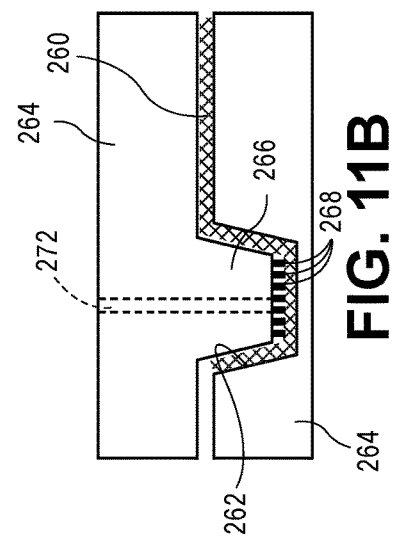
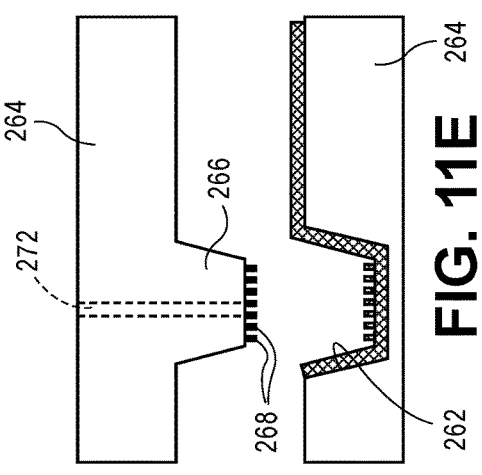
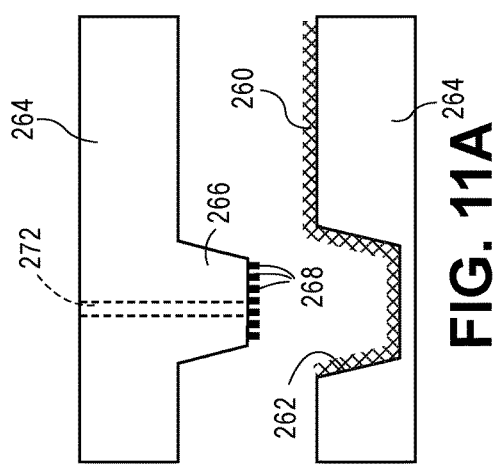
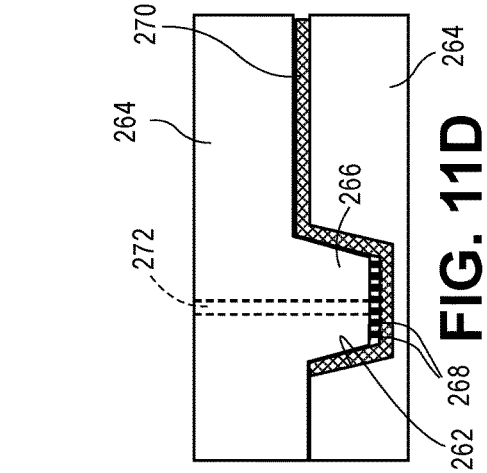

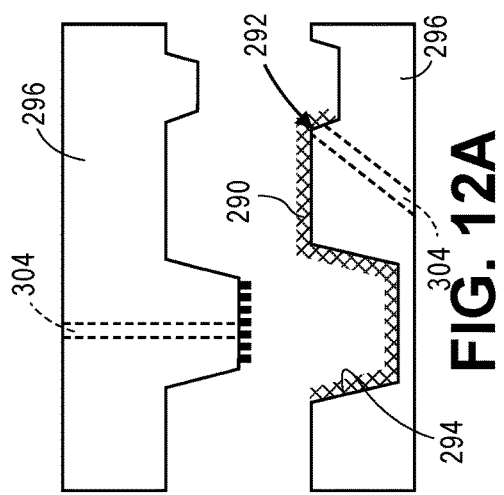
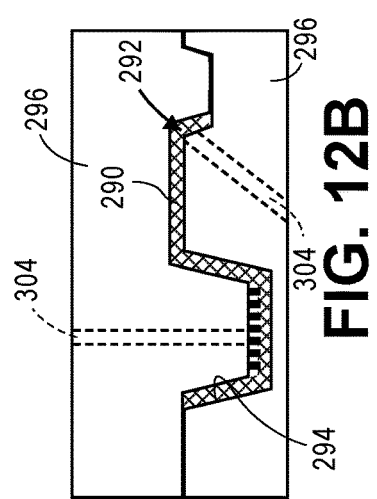
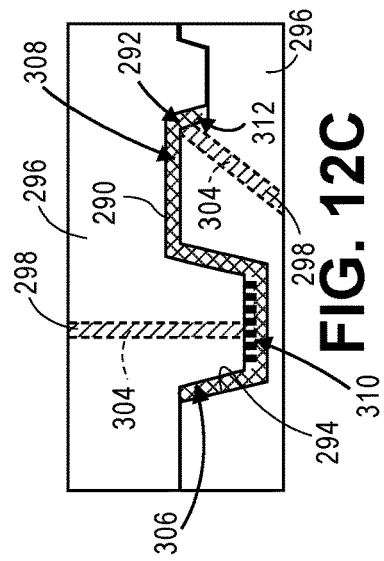
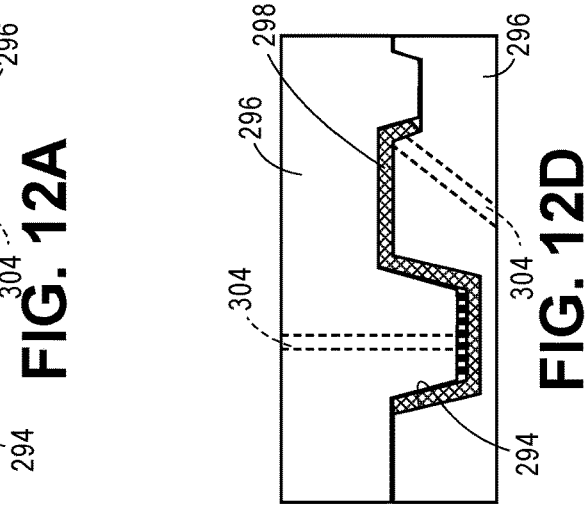
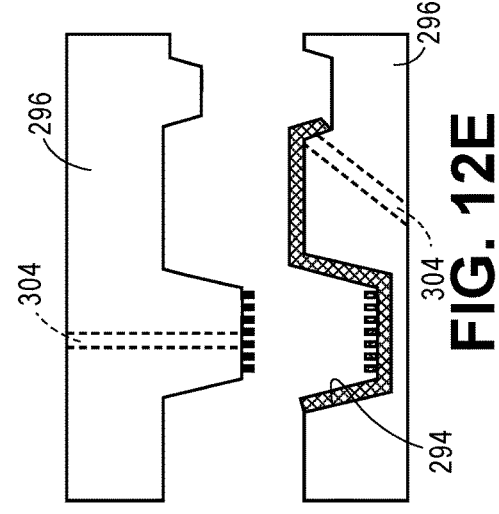

FIBER-REINFORCED COMPOSITE BUMPER BEAM AND CRUSH MEMBERS

INTRODUCTION

The present disclosure relates to fiber-reinforced composite energy-absorbing assemblies, and more specifically to fiber-reinforced composite bumper beam and crush member assemblies.

This section provides background information related to the present disclosure which is not necessarily prior art.

It is advantageous to improve crush performance of vehicle components. However, it is also advantageous that components of automobiles or other vehicles be light weight to improve fuel efficiency. Thus, vehicle components that exhibit adequate strength during both normal service and under extraordinary conditions such as collisions, while minimizing component weight are advantageous.

SUMMARY

This section provides a general summary of the disclosure, and is not a comprehensive disclosure of its full scope or all of its features.

In various aspects, the present disclosure provides an energy-absorbing structure for a vehicle. The energy-absorbing structure includes a first component and a second component. The first component includes a polymer and a first plurality of reinforcing fibers disposed therein. The first component includes a first bumper beam portion and a first crush member portion. The first bumper beam portion is at least partially defined by a first wall. The first crush member portion is at least partially defined by a second wall that projects from the first wall. The first bumper beam portion is integrally formed with the first crush member portion wall. At least some of the reinforcing fibers of the first plurality of reinforcing fibers continuously extend between the first wall and the second wall. The second component includes the polymer and a second plurality of reinforcing fibers. The second component includes a second bumper beam portion and a second crush member portion. The second bumper beam portion is at least partially defined by a third wall. The second crush member portion is at least partially defined by a fourth wall that projects from the third wall. The second bumper beam portion wall is integrally formed with the second crush member portion. At least some of the reinforcing fibers of the second plurality of reinforcing fibers continuously extend between the third wall and the fourth wall. The first component is joined to the second component. The first wall and the third wall cooperate to define a bumper beam. The second wall and the fourth wall cooperate to define a crush member.

In one aspect, the crush member further includes an interior compartment and a transverse plate. The interior compartment is defined by the second wall and the fourth wall. The transverse plate is disposed within the interior compartment. The transverse plate is fixed to at least one of the second wall and the fourth wall.

In one aspect, the transverse plate defines a waveform shape having a plurality of peaks and a plurality of valleys.

In one aspect, the bumper beam further includes an interior compartment and a plurality of projections. The interior compartment is defined by the first wall and the third wall. The projections are fixed to one of the first wall and the third wall. The projections extend into the interior compartment.

In one aspect, each respective projection includes he polymer and a plurality of chopped fibers.

In one aspect, the crush member includes a first end and a second end. The first end is adjacent to the bumper beam. The second end is opposite the first end. The second end includes an outwardly-extending flange that can engage a rail of the vehicle.

In one aspect, the polymer includes a thermoplastic polymer selected from the group consisting of: a polyamide (PA), polyetheretherketone (PEEK), polyetherketone (PEK), a polyphenylene sulfide (PPS), a thermoplastic polyurethane (TPU), polypropylene (PP), co-polymers thereof, and combinations thereof.

In one aspect, the polymer includes a thermoset polymer selected from the group consisting of: a benzoxazine, a bis-maleimide (BMI), a cyanate ester, an epoxy, a phenolic (PF), a polyacrylate (acrylic), a polyimide (PI), an unsaturated polyester, a polyeurethane (PUR), a vinyl ester, a siloxane, co-polymers thereof, and combinations thereof.

In one aspect, the reinforcing fibers of the first plurality and the reinforcing fibers of the second plurality are independently selected from the group consisting of: carbon fibers, glass fibers, basalt fibers, para-aramid fibers, meta-aramid fibers, polyethylene fibers, and combinations thereof.

In various aspects, the present disclosure provides an energy-absorbing structure for a vehicle. The energy-absorbing structure includes a bumper beam and at least one crush member. The bumper beam includes a first peripheral wall. The first peripheral wall includes a first polymer and a first plurality of reinforcing fibers distributed therein. The crush member defines a longitudinal axis. The crush member has a second peripheral wall. The crush member includes a second polymer and a second plurality of reinforcing fibers distributed therein. The second peripheral wall projects from the first peripheral wall along the longitudinal axis. At least some of the reinforcing fibers of the first plurality continuously extend from the first peripheral wall to the second peripheral wall.

In one aspect, the first polymer and the second polymer are respectively thermoplastic polymers, each independently selected from the group consisting of: polyamide (PA), polyetheretherketone (PEEK), polyetherketone (PEK), polyphenylene sulfide (PPS), thermoplastic polyurethane (TPU), polypropylene (PP), and combinations thereof. The reinforcing fibers of the first plurality of reinforcing fibers and the reinforcing fibers of the second plurality of reinforcing fibers are selected from the group consisting of: carbon fibers, glass fibers, basalt fibers, para-aramid fibers, meta-aramid fibers, polyethylene fibers, and combinations thereof.

In one aspect, the first polymer and the second polymer are respectively thermoset polymers each independently selected from the group consisting of: benzoxazine, bis-maleimides (BMI), cyanate esters, epoxy, phenolic (PF), polyacrylates (acrylic), polyamide-imide (PAI), unsaturated polyester, polyeurethane (PUR), vinyl ester, siloxane, and combinations thereof. The reinforcing fibers of the first plurality of reinforcing fibers and the reinforcing fibers of the second plurality of reinforcing fibers are independently selected from the group consisting of: carbon fibers, glass fibers, basalt fibers, para-aramid fibers, meta-aramid fibers, polyethylene fibers, and combinations thereof.

In various aspects, the present disclosure provides a method of manufacturing an energy-absorbing structure for a vehicle. The method includes forming a first component and a second component. Each of the respective first component and second component includes a polymer and a plurality of reinforcing fibers. The first component includes a first bumper beam portion that is at least partially defined by a first wall and a first crush member portion that is at least partially defined by a second wall. The second wall projects from the first wall. The second component includes a second bumper beam portion that is at least partially defined by a third wall and a second crush member portion that is at least partially defined by a fourth wall that projects from the first wall. The method further includes joining the first component to the second component to form the energy-absorbing structure. The first wall and the third wall cooperate to define a bumper beam. The second wall and the fourth wall cooperate to define a crush member.

In one aspect, at least some of the reinforcing fibers continuously extend between the first wall and the second wall of the first component. At least some of the reinforcing fibers of the plurality continuously extend between the third wall and the fourth wall of the second component.

In one aspect, the forming each of the respective first component and the second component includes high pressure resin-transfer molding (HP-RTM). The forming further includes disposing a fiber preform in a mold cavity. The fiber preform includes the plurality of reinforcing fibers. The forming further includes injecting a thermoset polymer resin into the mold cavity. The forming further includes impregnating a plurality of voids in the fiber preform with the thermoset polymer resin. The forming further includes curing the thermoset polymer resin and forming the respective first component and second component.

In one aspect, the forming the forming each of the respective first component and second component includes compression molding. The forming further includes preheating a preconsolidated polymeric sheet. The preconsolidated polymeric sheet includes a thermoplastic polymer resin and the plurality of reinforcing fibers. The forming further includes disposing the preconsolidated polymeric sheet in a mold cavity. The forming further includes applying heat and pressure to the preconsolidated polymeric sheet to form the respective first component and second component.

In one aspect, the reinforcing fibers are selected from the group consisting of: carbon fibers, glass fibers, basalt fibers, para-aramid fibers, meta-aramid fibers, polyethylene fibers, and combinations thereof.

In one aspect, a first surface of the first wall and a third surface of the third wall can form a first joint. A second surface of the second wall and a fourth surface of the fourth wall can form a second joint. Each of the first joint and the second joint are independently selected from the group consisting of: a half lap splice joint, a bevel lap splice joint, a tabled splice joint, and a tongue and groove joint.

In one aspect, the joining the first component and the second component includes applying an adhesive to at least one of a first surface of the first wall and a third surface of the third wall. The joining further includes applying the adhesive to at least one of a second surface of the second wall and a fourth surface of the fourth wall. The joining further includes contacting the first surface and the third surface to form the bumper beam. The joining further includes contacting the second surface and the fourth surface to form the crush member. The joining further includes curing the adhesive.

In one aspect, the joining the first component and the second component further includes extending a first plurality of fasteners through the first wall and the third wall and extending a second plurality of fasteners through the second wall and the fourth wall.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows an exemplary energy-absorbing structure for a vehicle including a bumper beam and two crush members;

FIGS. 2A-2C show an energy-absorbing structure assembly for a vehicle according to certain aspects of the present disclosure. FIG. 2A is an exploded isometric view of the energy-absorbing structure showing an upper component and a lower component; FIG. 2B is an isometric view of the energy-absorbing structure assembly; FIG. 2C is a sectional view of the energy-absorbing structure taken at line 2C-2C of FIG. 2A;

Figure 5B:
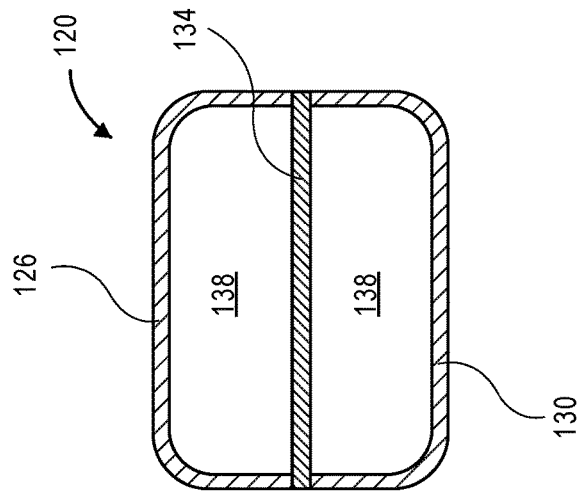
Figure 5A:
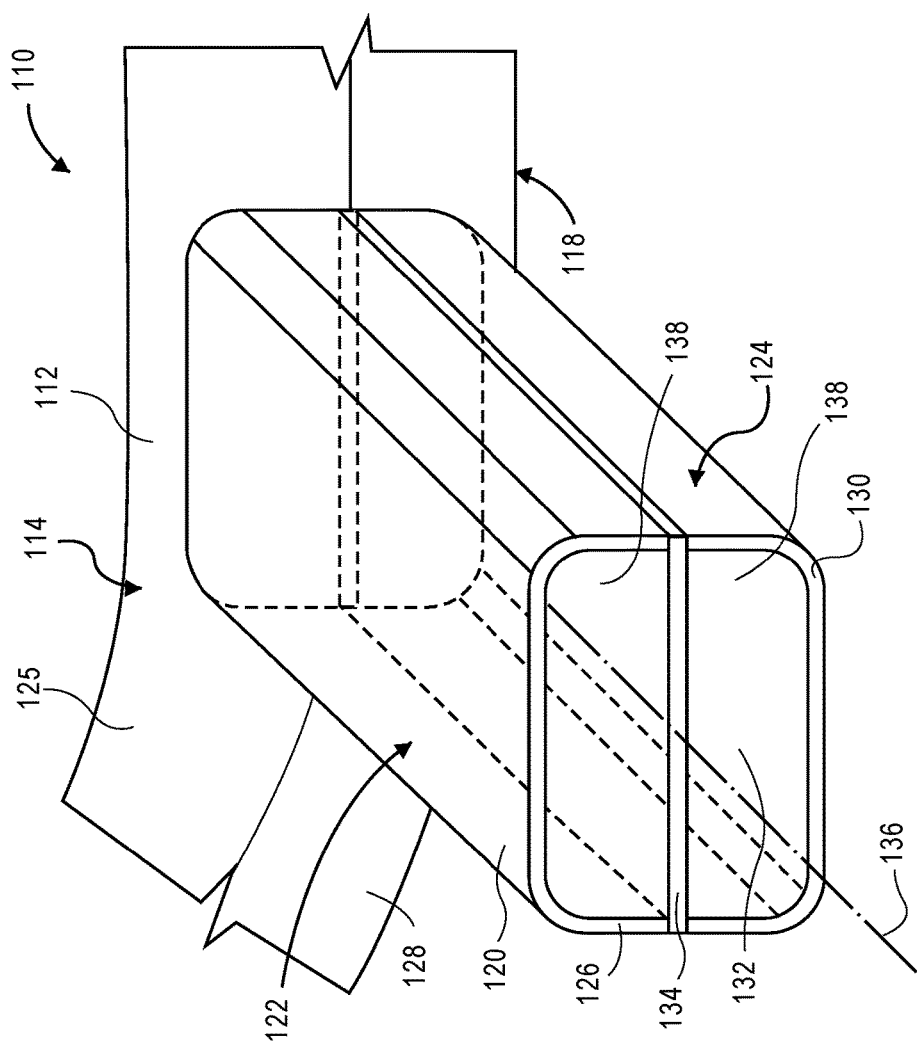
Figure 7:
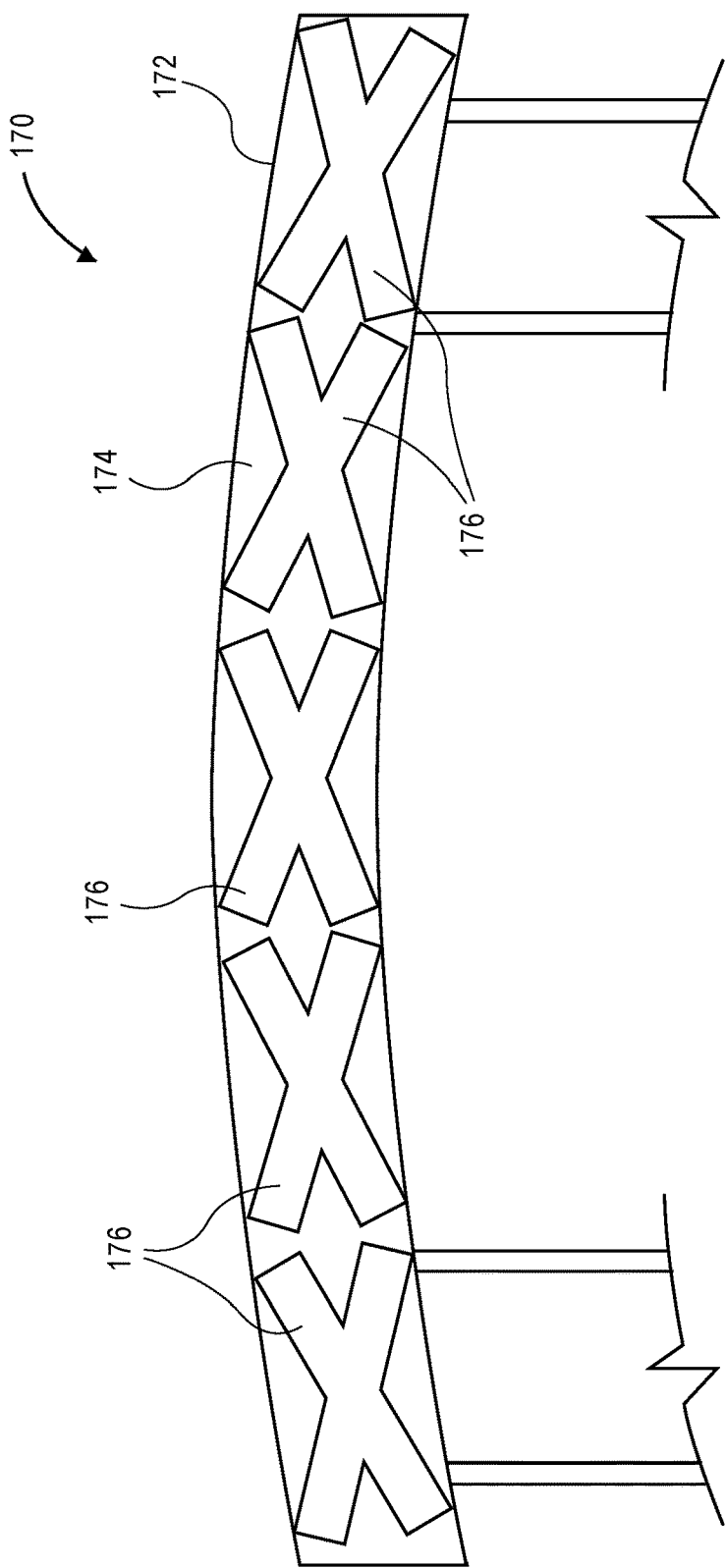
Figure 9A:
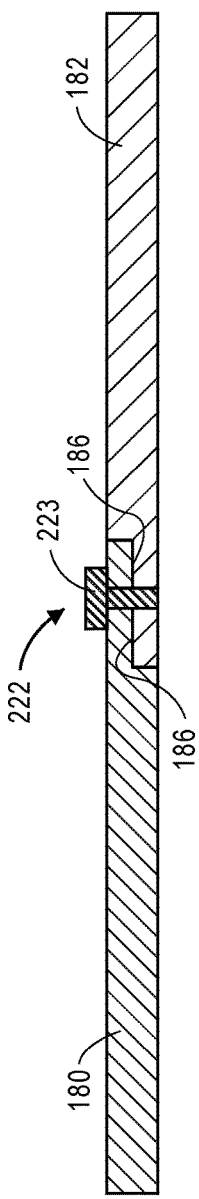
Figure 9B:
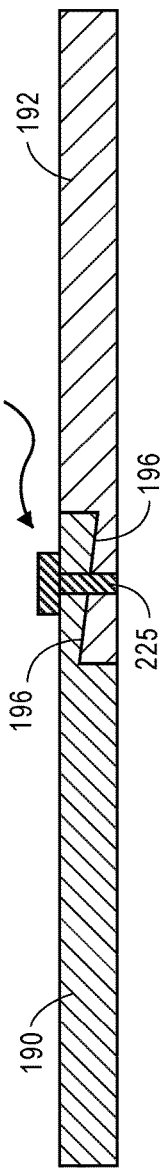
Figure 9C:
Figure 9D:
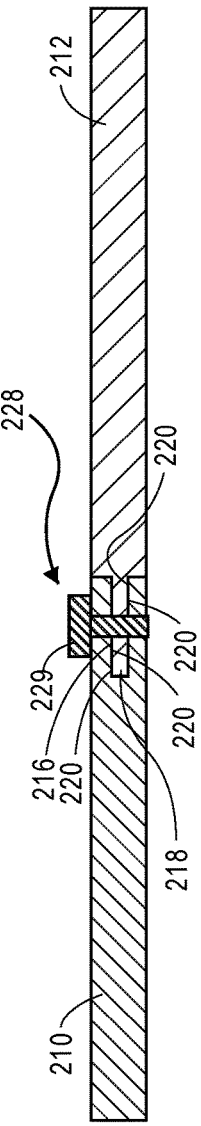

FIGS. 5A-5B show an energy-absorbing structure according to certain aspects of the present disclosure. FIG. 5A is a partial isometric view of the energy-absorbing structure; FIG. 5B is a sectional view of a crush member of the energy-absorbing structure;

FIGS. 6A-6B show a lower component of an energy-absorbing structure according to certain aspects of the present disclosure. FIG. 6A is a top view;

FIG. 6B is a sectional view taken at line 6B-6B of FIG. 6A;

FIG. 7 shows a top view of a lower component of another energy-absorbing structure according to certain aspects of the present disclosure;

FIGS. 8A-8D show isometric exploded views of joints between an upper component and a lower component of an energy-absorbing structure according to certain aspects of the present disclosure prior to being joined together. FIG. 8A shows a half lap splice joint; FIG. 8B shows a bevel lap splice joint; FIG. 8C shows a tabled splice joint; FIG. 8D shows a tongue and groove joint;

FIGS. 9A-9D show side sectional views of alternative joints between the upper component and the lower component of the energy-absorbing structure of FIGS. 8A-8D, further including mechanical fasteners. FIG. 9A shows a half lap splice joint; FIG. 9B shows a bevel lap splice joint; FIG. 9C shows a tabled splice joint;

FIG. 9D shows a tongue and groove joint;

FIGS. 10A-10F show a manufacturing process for a component of an energy-absorbing structure according to certain aspects of the present disclosure; FIG. 10A shows a fiber preform in disposed in a mold cavity; FIG. 10B shows the mold closed around the fiber preform; FIG. 10C shows injection of a polymer resin into the mold cavity; FIG. 10D shows the polymer resin being cured; FIG. 10E shows the mold being opened; FIG. 10F shows the component.

FIGS. 11A-11F show a manufacturing process for another component of an energy-absorbing structure according to certain aspects of the present disclosure; FIG. 11A shows a fiber preform in disposed in a mold cavity; FIG. 11B shows the mold closed around the fiber preform; FIG. 11C shows injection of a polymer resin into the mold cavity; FIG. 11D shows the polymer resin being cured;

FIG. 11E shows the mold being opened; FIG. 11F shows the component.

FIGS. 12A-12F show a manufacturing process for yet another component of an energy-absorbing structure according to certain aspects of the present disclosure; FIG. 12A shows a fiber preform in disposed in a mold cavity; FIG. 12B shows the mold closed around the fiber preform; FIG. 12C shows injection of a polymer resin into the mold cavity; FIG. 12D shows the polymer resin being cured; FIG. 12E shows the mold being opened; and FIG. 12F shows the component.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Energy-absorbing structures (or crush assemblies) are used in vehicles to absorb collision energy through controlled deformation. Energy-absorbing structures may include crush members, such as crush cans or boxes, attached to a bumper. A crush member may include an outer or peripheral wall extending along a longitudinal axis, and a hollow interior. The crush member may also include internal structural geometry for reinforcement. The amount of energy absorbed by a crush member is a function of the material and the geometry of the structure under crush load.

Crush members may be constructed from fiber-reinforced composite or metal, such as aluminum or steel. Fiber-reinforced composite materials include a polymeric matrix having a reinforcing material distributed therein. Suitable reinforcing materials include non-crimp fabric ("NCF") carbon or glass fibers, glass fiber, carbon fiber, aramid fiber, basalt fiber, fiber made from natural products (e.g., hemp, jute, or other bast fibers), high strength polymeric fibers (e.g., high strength polyethylene or high strength polypropylene), by way of non-limiting example. The reinforcing materials may be fabricated as woven fabric, continuous random fabric, discontinuous random fibers, chopped random fabric, continuous strand unidirectional plies, oriented chopped strand plies, braided fabric and any combinations thereof. The polymeric matrix may be a thermoplastic polymer or a thermoset polymer.

Crush members are designed to absorb energy in a crash. Metal crush members absorb energy as molecules slide past one another to deform the component without fracturing. Fiber-reinforced composite crush members absorb energy through fragmentation, pulverization, fronding, tearing, interlaminar, intralaminar, fiber-matrix debonding, and fiber pullout failure modes, by way of non-limiting example. However, crush members can potentially detach from the bumper in a collision, particularly when the energy-absorbing structure is impacted at an angle that is non-parallel to the longitudinal axis of the crush member (i.e., the collision is not head on). Thus, in the case of a composite crush member, the crush member may break away from the path of impact prior to the crush member absorbing energy or prior to the crush member absorbing a maximum amount of energy possible based on the material and geometry of the crush member, thereby reducing the overall energy absorption of the assembly.

Figure 1:
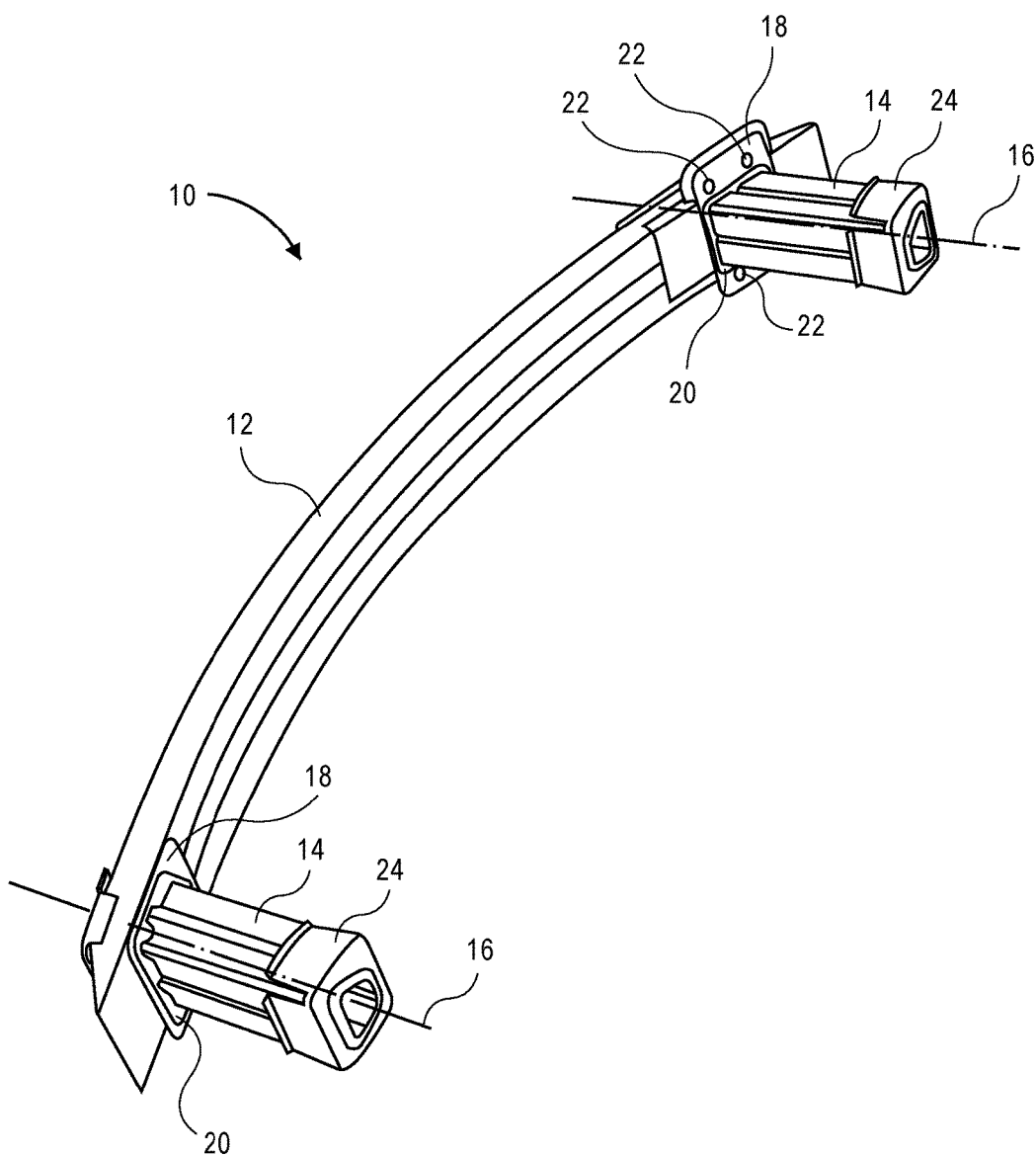

Fiber-reinforced composite crush members are lighter weight than metal crush members. Such lighter weight crush members may improve vehicle fuel efficiency. However, there is a need for a fiber reinforced crush assembly that exhibits improved crush strength and minimizes or avoids detachment of the crush member from the bumper during crush Referring to FIG. 1, an example crush assembly 10 for a vehicle is provided. The crush assembly 10 includes a bumper beam 12 and two crush members (e.g., crush cans or boxes) 14. Each of the crush members 14 extends along a longitudinal axis 16. The crush assembly 10 further includes two steel plates 18 that are disposed between the bumper beam 12 and the respective crush members 14. The steel plates 18 respectively connect the crush members 14 to the bumper beam 12. More specifically, the crush members 14 may be fixed to the respective plates 18 by welds 20. The plates 18 may be fixed to the bumper beam 12 by a plurality of fasteners 22. The crush members 14 may include respective end caps 24 for attachment to respective vehicle rails (not shown). The crush assembly 10 may also include other elements such as decorative fascia (not shown).

As discussed above, the crush members 14 ideally maximize energy absorption during crush (e.g., in a vehicle collision). However, when the crush assembly 10 is impacted in a direction that is non-parallel with respect to the longitudinal axes 16 of the crush members 14, the crush members 14 are prone to separating from the bumper beam 12, which may potentially occur prior to being fully crushed. Therefore, the crush members 14 may not be available to fully absorb energy.

In various aspects, the present disclosure provides high strength energy-absorbing structures for vehicles. More specifically, the present disclosure provides fiber-reinforced energy-absorbing assemblies having at least some of the fibers continuously extending between a bumper beam and a crush member, to reduce or prevent the crush member from detaching from the bumper beam during crush, thereby retaining the filaments of the composite in the line of impact during crush for improved energy absorption.

Figure 2A:
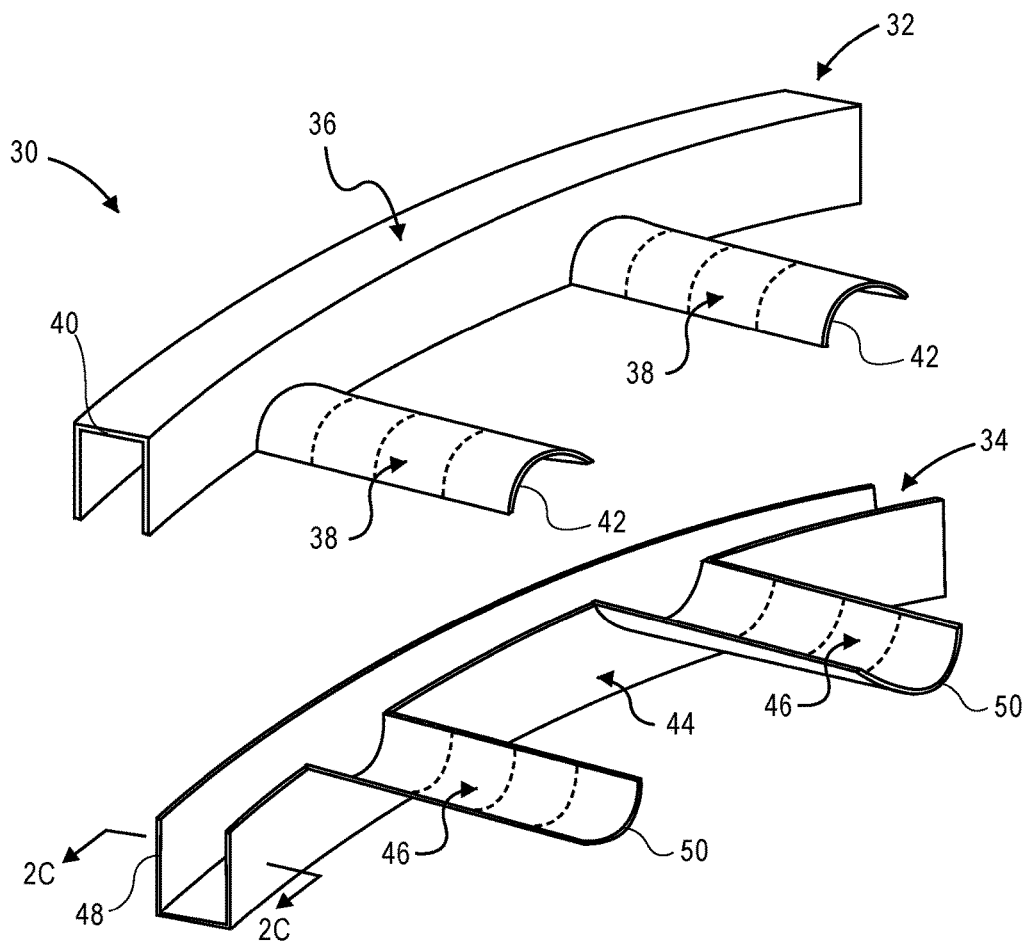

With reference to FIG. 2A, an energy-absorbing assembly or energy-absorbing structure 30 according to certain aspects of the present disclosure may include a first or upper component 32 and a second or lower component 34. The upper component 32 may include a first bumper beam portion or bumper beam upper portion 36 and two first crush member portions or crush member upper portions 38. The bumper beam upper portion 36 may be at least partially defined by a first wall 40. The crush member upper portions 38 may be at least partially defined by respective second walls 42. The second walls 42 may project from the first wall 40. The first wall 40 may be integrally formed with the second walls 42.

The lower component 34 may include a second bumper beam portion or bumper beam lower portion 44 and two second crush member portions or crush member lower portions 46. The bumper beam lower portion 44 may be at least partially defined by a third wall 48. The crush member lower portions 46 may be at least partially defined by respective fourth walls 50. The fourth walls 50 may project from the third wall 48. The third wall 48 may be integrally formed with the fourth walls 50.

Figure 2C:
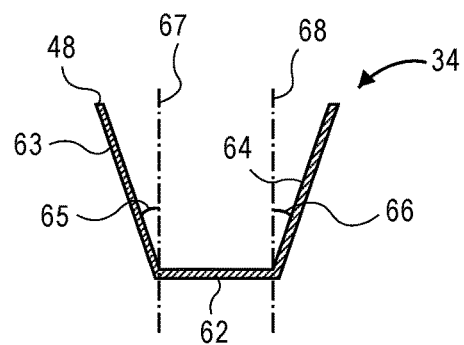
Figure 2B:
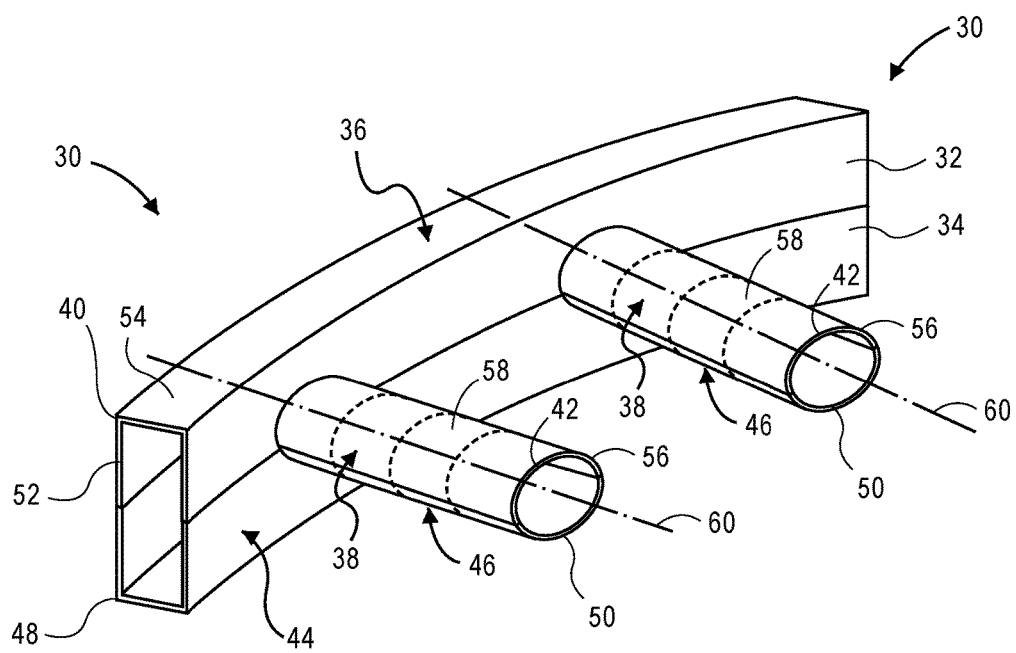

Referring to FIG. 2B, together, the upper component 32 and the lower component 34 may form the energy-absorbing structure 30. The upper component 32 and the lower component 34 may be joined to one another by adhesive, mechanical fasteners, or a combination of adhesive and mechanical fasteners, as discussed in greater detail below (FIGS. 8A-9D). The first wall 40 and the third wall 48 may engage one another to form a first peripheral wall 52 defining a bumper beam 54. The second walls 42 and the fourth walls 50 may respectively engage one another to form two second peripheral walls 56 defining respective crush members 58. The crush members 58 may extend along longitudinal axes 60.

With reference to FIG. 2C, the third wall 48 of the lower component 34 may include a bottom wall 62 and opposing side walls 63, 64. Each side wall 63, 64 may form a respective draft angle 65, 66 along respective axes 67, 68 that are substantially perpendicular to the bottom wall 62. The draft angles 65, 66 may have the same magnitude. The draft angles 65, 66 ensure that the side walls 63, 64 are disposed at greater than 0° to a direction of die draw to facilitate removal from a die during manufacturing. The draft angles 65, 66 may be greater than or equal to about 0.5°, optionally greater than or equal to about 0.5° and less than or equal to about 5°, optionally greater than or equal to about 1° and less than or equal to about 5°, optionally greater than or equal to about 2° and less than or equal to about 5°, and optionally greater than or equal to about 3° and less than or equal to about 4°. Although the draft angles 65, 66 are described with reference to the lower component 34, the upper component 32 may include similar draft angles 65, 66.

The upper component 32 is formed from a first composite material including a first polymer matrix and a first plurality of reinforcing fibers. In some embodiments, and as discussed in greater detail below, the reinforcing fibers may be continuous reinforcing fibers. The lower component 34 is formed from a second composite material including a second polymer matrix and a second plurality of reinforcing fibers distributed therein. The first and second composite materials may be the same or they may be distinct from one another. Distinct composite materials may have different polymer matrix compositions, different fiber compositions, and/or a different ratio of fiber to polymer matrix, by way of non-limiting example.

Figure 3:
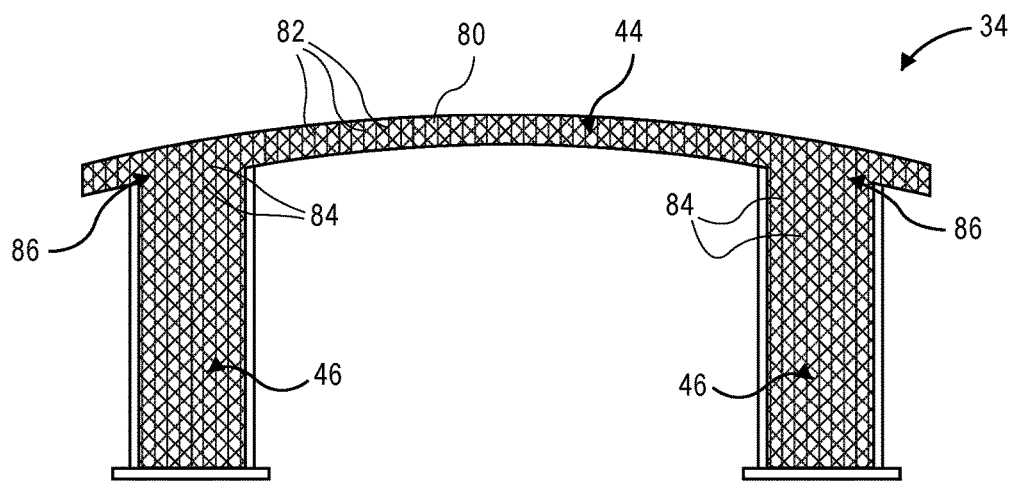
FIG. 3 is a top plan view of the energy-absorbing structure of FIG. 2A.

Referring to FIG. 3, the lower component 34 is shown with the second polymer matrix 80 and the second plurality of reinforcing fibers 82. At least some of the fibers 82, i.e., a subset 84 of the fibers 82, continuously extend between the bumper beam lower portion 44 and the crush member lower portion 46. The subset of continuously extending fibers 84 locally reinforces an area 86 between the bumper beam and crush member lower portions 44, 46, thereby improving angular impact performance of the energy-absorbing structure 30. The crush members 58 are less likely to detach from the bumper beam 54 compared to the crush assembly 10 of FIG. 1 having separate bumper beam 12 and crush member components 14.

The bumper beam lower portion 44 and the crush member lower portion 46 are shown as including the second polymer matrix 80 and the second plurality of reinforcing fibers 82. In other examples, however, the bumper beam lower portion 44 and the crush member lower portion 46 may include distinct composite materials, such as materials having different ratios of fiber to polymer matrix. In some examples, a first peripheral wall includes a first composite material and a second peripheral wall includes a second composite material. The first and second composite materials may be distinct, such as materials having different ratios of fiber to polymer matrix.

Suitable reinforcing fibers 82 may include non-crimp fabric ("NCF") carbon or glass fibers, glass fiber, carbon fiber, aramid fibers (e.g., para-aramid fiber and meta-aramid fiber), basalt fiber, fiber made from natural products (e.g., hemp, jute, or other bast fibers), high strength polymeric fibers (e.g., high strength polyethylene or high strength polypropylene), by way of non-limiting example. The reinforcing fibers 82 may be fabricated as woven fabric, continuous random fabric, discontinuous random fibers, continuous strand unidirectional plies, braided fabric, and any combinations thereof.

The second polymer matrix 80 may include a thermoset polymer or a thermoplastic polymer. Suitable thermoset polymeric resins may include a benzoxazine, a bis-maleimides (BMI), a cyanate ester, an epoxy, a phenolic (PF), a polyacrylate (acrylic), a polyimide (PI), an unsaturated polyester, a polyurethane (PUR), a vinyl ester, a siloxane (e.g., silicone), and any co-polymers or combinations thereof.

Suitable thermoplastic polymeric resins may include acrylonitrile butadiene styrene (ABS), poly(methyl methacrylate) (PMMA), celluloids, cellulose acetate, cycloolefin copolymer (COC), ethylene-vinyl acetate (EVA), ethylene vinyl alcohol (EVOH), fluoroplastics (e.g., polytetrafluoroethylene (PTFE), fluorinated ethylene propylene (FEP), perfluoroalkoxy alkane (PFA), polychlorotrifluoroethylene (PCTFE), ethylene chlorotrifluoroethylene (ECTFE), ethylene tetrafluoroethylene (ETFE)), polyacetal (POM or Acetal), polyacrylonitrile (PAN), a polyamide (nylons), polyamide-imide (PAI), a polyaryletherketone (PAEK) (e.g., polyetherketone (PEK), polyetheretherketone (PEEK), polyetherketoneketone (PEKK)), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polycarbonate (PC), a polyhydroxyalkanoates (PHA), a polyketone (PK), a polyester, polyetherimide (PEI), a polyethersulfone (PES), a polysulfone (PSU), a polyethylenechlorinate (PEC), polylactic acid (PLA), polymethylpentene (PMP), polyphenylene oxide (PPO), polyphenylene sulfide (PPS), a polyphthalamide (PPA), polystyrene (PS), polytrimethylene terephthalate (PTT), a thermoplastic polyurethane (TPU), polyvinyl acetate (PVA), polyvinyl chloride (PVC), polyvinylidene chloride (PVDC), styrene-acrylonitrile (SAN), polycarbonate+acrylonitrile butadiene styrene mix (ABS+PC), polypropylene (PP), polyethylene (PE), and any co-polymers or combinations thereof.

Figure 4:
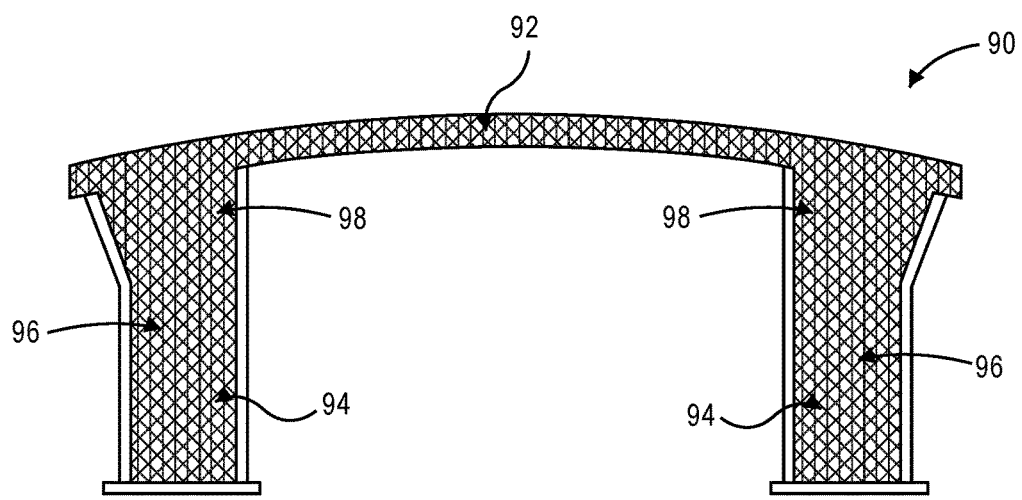
FIG. 4 is a top plan view of another energy-absorbing structure according to certain aspects of the present disclosure.

While the crush members 58 are shown as cylindrical and having substantially uniform diameters, the cylindrical geometry is merely exemplary and other shapes are contemplated. For example, the crush members 58 may have rectangular cross sections in a direction perpendicular to the longitudinal axes 60. Referring now to FIG. 4, a lower component 90 of another energy-absorbing structure according to certain aspects of the present disclosure is shown. The lower component 90 may be similar to the bumper beam lower portion 44 and two crush member lower portions 94 of FIGS. 2A-3. Each crush member portion 94 includes a first portion 96 that is substantially cylindrical and can be disposed adjacent to the vehicle rails (not shown). Each crush member portion 94 further includes a second portion 98 is disposed between the first portion 96 and the bumper beam 92. The second portion 98 may gradually widen between the first portion 96 and the bumper beam 92 so that the crush member lower portion 94 is widest at a location adjacent to the bumper beam 92. In some examples, the second portion 98 may be an oblique conical frustum. The energy-absorbing structure may include an upper component that is similar to the lower component 90.

Although the energy-absorbing structure 30 is shown as two distinct components 32, 34, two components are merely exemplary. In other non-limiting examples, an energy-absorbing structure may include four components or a single component. The energy-absorbing structure having four components may include an upper left component, an upper right component, a lower left component, and a lower right component, for example. The respective right components may cooperate to define a first crush member and a left portion of a bumper beam. The respective left components may cooperate to define a second crush member and a right portion of the bumper beam. The energy-absorbing structure having a single component may be a unibody energy-absorbing structure.

With reference to FIGS. 5A-5B, another energy-absorbing assembly or energy-absorbing structure 110 according to certain aspects of the present disclosure is provided. The energy-absorbing structure 110 may include a bumper beam 112 having a first bumper beam or bumper beam upper portion 114 and a bumper beam lower portion 118. The energy-absorbing structure 110 may further include at least one crush member 120. The crush member 120 may include a first crush member or crush member upper portion 122 and a second crush member or crush member lower portion 124. The bumper beam upper portion 114 may be at least partially defined by a first wall 125, crush member upper portion 122 may be at least partially defined by a second wall 126, the bumper beam lower portion 118 may be at least partially defined by a third wall 128, and the crush member lower portion 124 may be at least partially defined by a fourth wall 130. The first wall 125 may be integrally formed with the second wall 126 and the third wall 128 may be integrally formed with the fourth wall 130.

The energy-absorbing structure 110 may be formed from a composite having a polymer matrix and a plurality of reinforcing fibers (not shown). At least some of the reinforcing fibers may continuously extend between the first wall 125 and the second wall 126. At least some of the reinforcing fibers may continuously extend between the third wall 128 and the fourth wall 130.

The second wall 126 and the fourth wall 130 may cooperate to define an interior compartment 132. The crush member 120 may further include a transverse plate 134 disposed within the interior compartment 132. The transverse plate 134 may increase a stiffness of the energy-absorbing structure 110, thereby improving crush performance. The transverse plate 134 may be disposed parallel to a longitudinal axis 136 of the crush member 122. The transverse plate 134 may be disposed between the second wall 126 and the fourth wall 130. The transverse plate 134 may be fixed to both of the second wall 126 and the fourth wall 130 such that it divides the interior compartment 132 into two sub-compartments 138 of substantially equal volumes.

The transverse plate 134 may have a substantially planar shape, as shown. However, in other embodiments, the transverse plate 134 may have other shapes. By way of non-limiting example the transverse plate 134 may be corrugated or define a waveform shape having a plurality of peaks respectively alternating with a plurality of valleys (not shown). The peaks and valleys may be disposed substantially parallel to the longitudinal axis 126. In other embodiments, the peaks and valleys may be disposed substantially perpendicular to the longitudinal axis 126.

While the transverse plate 134 is shown disposed between the second and fourth walls 126, 130 and substantially parallel to the longitudinal axis 136, other arrangements are contemplated. For example in other embodiments not shown here, the transverse plate 134 may be included in the upper portion 122 only or the lower portion 124 only. Where the transverse plate 134 is part of the upper portion 122, it may be fixed to the second wall 126 at two locations on the second wall 126. Where the transverse plate 134 is part of the lower portion 124, it may be fixed to the fourth wall 130 at two locations on the fourth wall 130. Moreover, the transverse plate 134 may be disposed such that it is non-parallel with the longitudinal axis 136. In still other embodiments, the crush member 120 may include more than one transverse plate 134. For example, the upper portion 122 may include a transverse plate 134 fixed to the second wall 126 and the lower portion 124 may include a transverse plate 134 fixed to the fourth wall 130. In still other embodiments, a similar transverse plate 134 may be disposed within the bumper beam 112 (not shown).

The transverse plate 134 may be formed from a fiber-reinforced composite material or a metal. When the transverse plate 134 includes a composite material, it may be include the same polymer and reinforcing fibers as the upper and lower components, or a different polymer and reinforcing material than the upper and lower components.

With reference to FIGS. 6A-6B, a lower component 150 of another energy-absorbing structure according to certain aspects of the present disclosure is shown. The lower component 150 includes a bumper beam lower portion 152 that is at least partially defined by a wall 154 (third wall). The wall 154 may cooperate with a wall of an upper component (not shown) to define an interior compartment 156. The lower component 150 may further include a crush member lower portion 158 that may be similar to the crush member lower portion 46 of the energy-absorbing structure 30 of FIGS. 2A-3. The energy-absorbing structure may be formed from a composite including a polymer matrix and a plurality of reinforcing fibers, at least some of which extend between a bumper beam and a crush member (not shown).

The lower component 150 may further include a plurality of projections, which may be ribs 160, fixed to the wall 154 and extending into the interior compartment 156. The ribs 160 may extend from a first end 162 of the bumper beam lower portion 152 to a second end 164 opposite the first end 162. The ribs 160 may provide geometric stiffness to the energy-absorbing structure. Although the ribs 160 are shown as part of the lower component 150, the configuration shown is merely exemplary. The ribs 160 may be formed from the same polymer as the lower component 150 or a different polymer than the lower component 150. The ribs may include a plurality of chopped fibers (not shown). The ribs 160 may be present in one or both of the upper component (not shown) and the lower component 150.

While the projections are shown as ribs 160, the projection geometry is merely exemplary and other shapes and configurations are contemplated. The projections may be disposed on any portion of the wall 154. The projections may include cross-hatching or a grid design, by way of non-limiting example. Referring now to FIG. 7, a lower component 170 of yet another energy-absorbing structure according to the principles of the present disclosure is shown. The lower component 170 may be similar to the lower component 150 of FIGS. 6A-6B; thus, only the differences will be discussed. The lower component 170 includes a wall 172 and an interior compartment 174 similar to the wall 154 and interior compartment 156 of the lower component 150 of FIGS. 6A-6B. The lower component 170 further includes a plurality of projections, which may be X-shaped projections 176, extending from the wall 172 into the interior compartment 174.

Referring to FIGS. 8A-8D, various exemplary joints for fixing an upper component to a lower component according to certain aspects of the present disclosure are provided. In FIG. 8A, an upper component 180 is joined to a lower component 182 via a half lap splice joint 184. The upper component 180 may be fixed to the lower component 182 by a layer of adhesive (not shown) disposed between opposing contact surfaces 186. The opposing contact surfaces 186 may be a first surface on a first wall, a second surface on a second wall, a third surface on a third wall, or a fourth surface on a fourth wall (see, e.g., first, second, third, and fourth walls 40, 42, 48, 50 of FIGS. 2A-3).

In FIG. 8B, an upper component 190 is joined to a lower component 192 via a bevel lap splice joint 194. The upper component 190 may be fixed to the lower component 192 by a layer of adhesive (not shown) disposed between opposing contact surfaces 196. The opposing contact surfaces 196 may be a first surface on a first wall, a second surface on a second wall, a third surface on a third wall, or a fourth surface on a fourth wall (see, e.g., first, second, third, and fourth walls 40, 42, 48, 50 of FIGS. 2A-3).

In FIG. 8C, an upper component 200 is joined to a lower component 202 via a tabled splice joint 204. The upper component 200 may be fixed to the lower component 202 by a layer of adhesive (not shown) disposed between opposing contact surfaces 206. The opposing contact surfaces 206 may be first surface(s) on a first wall, second surface(s) on a second wall, third surface(s) on a third wall, or fourth surface(s) on a fourth wall (see, e.g., first, second, third, and fourth walls 40, 42, 48, 50 of FIGS. 2A-3).

In FIG. 8D, an upper component 210 is joined to a lower component 212 via a tongue and groove joint 214. While the upper component 210 is shown with a groove 216 and the lower component 212 is shown with a tongue 218, the groove 216 and tongue 218 may be reversed so that the tongue 218 is on the upper component 210 and the groove 216 is on the lower component 212 (not shown). The upper component 210 may be fixed to the lower component 212 by a layer of adhesive (not shown) disposed between opposing contact surfaces 220. The opposing contact surfaces 220 may be first surface(s) on a first wall, second surface(s) on a second wall, third surface(s) on a third wall, or fourth surface(s) on a fourth wall (see, e.g., first, second, third, and fourth walls 40, 42, 48, 50 of FIGS. 2A-3). The adhesive of each of the exemplary joints of FIGS. 8A-8D may include a methacrylate adhesive (e.g., Plexus® MA530), a urethane adhesive (e.g., Ashland Pliogrip® 7770), or an epoxy adhesive (e.g., Magnobond® 56), by way of non-limiting example.

With reference to FIGS. 9A-9D, joints may also be provided with one or more fasteners, which may be provided in addition to or in place of adhesive. The fasteners may include rivets (e.g., self-piercing rivets (SPR)), threaded fasteners (e.g., flow drill screws (FDS)), or bolts, by way of non-limiting example. Referring to FIG. 9A, a half lap splice joint 222 between the upper component 180 and the lower component 182 may include one or more fasteners 223. Referring to FIG. 9B, a bevel lap splice joint 224 between the upper component 190 and the lower component 192 may include one or more fasteners 225. Referring to FIG. 9C, a tabled splice joint 226 between the upper component 200 and the lower component 202 may include one or more fasteners 227. Referring to FIG. 9D, a tongue and groove joint 228 between the upper component 210 and the lower component 212 may include one or more fasteners 229.

In certain aspects, the present disclosure provides a method of manufacturing a component (e.g., an upper component or a lower component) for an energy-absorbing structure. The energy-absorbing structure may be formed by resin-transfer molding (RTM), such as high pressure resin-transfer molding (HP-RTM). HP-RTM may include high pressure injection resin-transfer molding (HP-IRTM) or high pressure compression resin-transfer molding (HP-CRTM). RTM is a closed-mold manufacturing process that involves combining and curing a dry fiber preform and a polymeric resin within a mold cavity to form a composite component. The HP-RTM processes (both HP-IRTM) and HP-CRTM) may use thermoset resins. Differences between HP-IRTM and HP-CRTM will be discussed in detail below in conjunction with FIGS. 10A-10F.

Suitable thermoset polymeric resins may include precursors that are or can form a benzoxazine, a bis-maleimides (BMI), a cyanate ester, an epoxy, a phenolic (PF), a polyacrylate (acrylic), a polyimide (PI), an unsaturated polyester, a polyeurethane (PUR), a vinyl ester, a siloxane (e.g., silicone), and any co-polymers or combinations thereof.

With reference to FIGS. 10A-10F a method of manufacturing an energy-absorbing structure according to certain aspects of the present disclosure is provided. In FIG. 10A, a fiber preform 230 may be placed into a cavity 232 of a mold 234. The fiber preform 230 may include reinforcing materials or fibers, at least some of which may continuously extend between a bumper beam portion 236 of the cavity 232 and a crush member portion 238 of the cavity 232. The process of placing the fiber preform 230 in the cavity 232 of the mold 234 may be similar for HP-IRTM and HP-CRTM. Suitable reinforcing materials include non-crimp fabric ("NCF") carbon or glass fibers, glass fiber, carbon fiber, aramid fiber, basalt fiber, fiber made from natural products (e.g., hemp, jute, or other bast fibers), high strength polymeric fibers (e.g., high strength polyethylene or high strength polypropylene), by way of non-limiting example. The reinforcing materials may be fabricated as woven fabric, continuous random fabric, discontinuous random fibers, chopped random fabric, continuous strand unidirectional plies, oriented chopped strand plies, braided fabric and any combinations thereof, by way of non-limiting example.

In FIG. 10B, the mold 234 may be closed around the fiber preform 230 so that the fiber preform 230 is disposed within a gap 240 in the mold. For HP-IRTM, the gap 240 may be equal to about a desired thickness of the final component (see thickness 252 of component 250 of FIG. 10F). Thus, the mold 234 may be in a fully-closed position. For HP-CRTM, the mold 234 may be in a resin impregnation position in which the gap 240 is greater than the gap 240 in the fully-closed position (not shown). For example, in HP-CRTM, the gap 240 may be greater than or equal to about 0.5 mm to less than or equal to about 5 mm more than the desired thickness of the final component (see FIG. 10F).

In FIG. 10C, a hardener and polymer resin 242 may be pumped into the cavity 232 through a passage 244 in the mold 234. The hardener and polymer resin 242 are mixed in a mix head (not shown) prior to injection. While a single passage 244 is shown, multiple passages 244 may be employed. For example, two passages 244 may be used to inject the polymer resin 242 at the bumper beam portion 236 and the crush member portion 238, respectively. In HP-IRTM, the polymer resin 242 may be injected at pressures of less than or equal to about 200 bar, optionally greater than or equal to about 20 bar to less than or equal to about 200 bar, and optionally greater than or equal to about 50 bar to less than or equal to about 100 bar. The high pressure facilitates flow of the hardener and polymeric resin 242 to reach edges 246 of the mold 234 to thoroughly impregnate the fiber preform 230. A mold cavity pressure may be greater than or equal to about 30 bar and less than or equal to about 120 bar, optionally greater than or equal to about 40 bar and less than or equal to about 100 bar, and optionally greater than or equal to about 50 bar and less than or equal to about 80 bar.

In HP-CRTM, because the mold 234 is in the resin impregnation position where the gap 240 is greater than the desired thickness of the component, resistance to resin flow is lower when compared to the fully-closed mold position of HP-IRTM. Thus, the injection pressure in HP-CRTM may be lower than the injection pressure in HP-IRTM. In HP-CRTM, the polymer resin 242 is injected at pressures of less than or equal to about 150 bar, optionally greater than or equal to about 20 bar to less than or equal to about 150 bar, and optionally greater than or equal to about 50 bar to less than or equal to about 120 bar. However, as a result of the mold 234 being in the resin impregnation position, the polymeric resin 242 may only partially impregnate the fiber preform 230. Therefore, at least some of the polymeric resin 242 may form a layer along a top surface 248 of the fiber preform 230. The mold cavity pressure may be greater than or equal to about 30 bar and less than or equal to about 120 bar, optionally greater than or equal to about 40 bar and less than or equal to about 100 bar, and optionally greater than or equal to about 50 bar and less than or equal to about 80 bar.

In FIG. 10D, the polymeric resin may be cured. In HP-IRTM, the mold 234 may remain in the fully-closed position while the polymeric resin 242 is cured. In HP-CRTM the mold 234 may fully close to decrease the gap 240. Thus, the mold 234 may move from the resin impregnation position to the fully-closed position. The application of pressure may facilitate the flow of the polymeric resin 242 so that the polymeric resin 242 fully impregnates the fiber preform 230. For both HP-IRTM and HP-CRTM, a cure temperature is dependent on the particular thermoset resin. In an epoxy system, for example, the polymeric resin may be cured at a mold temperature of greater than or equal to about 60° C. to less than or equal to about 150° C., and optionally about 100° C.

At FIGS. 10E-10F, after curing of the polymer resin 242 is complete the mold 234 may open to release a cured component 250. The cured component 250 may be one of an upper component (see upper component 32 of FIGS. 2A-3) or a lower component (see lower component 34 of FIGS. 2A-3) of an energy-absorbing structure (see energy-absorbing structure 30 of FIGS. 2A-3). The process of FIGS. 10A-10F may be repeated to form the other of the upper component and the lower component.

The upper component and the lower component may be joined to one another to form the energy-absorbing structure (as generally discussed in conjunction with FIGS. 8A-9D). More specifically, adhesive may be applied to at least one of a first surface of the first wall and a third surface of a third wall. The first and third surfaces may be brought into contact to form a bumper beam. Adhesive may be applied to at least one of a second surface of a second wall and a fourth surface of a fourth wall. The second and fourth surfaces may be brought into contact to form a crush member. The adhesive may be cured. The adhesive may be cured at a temperature of greater than or equal to about 0° C. and less than or equal to about 250° C., and optionally about 100° C. The adhesive curing process may have a duration of greater than or equal to about 10 minutes to less than or equal to about 24 hours, and optionally about 1 hour. In addition to or in place of the adhesive, the upper component and the lower component may be joined by a plurality of mechanical fasteners.

Referring to FIGS. 11A-11F, a method of manufacturing a component (e.g., an upper component or a lower component) having a plurality of projections within a bumper beam for an energy-absorbing structure according to certain aspects of the present disclosure is provided. The method may be similar to the method of FIGS. 10A-10F; thus, only the differences will be discussed in detail. In FIG. 11A, a fiber preform 260 may be placed into a cavity 262 of a mold 264. A convex portion 266 of the mold 264 may include a plurality of projections 268. The projections 268 of the mold 264 may be complementary to the desired projections of the component (see projections 208 on component 278 of FIG. 11F). In FIG. 11B, the mold 264 may be closed around the fiber preform 260.

In FIG. 11C, a polymer resin 270 may be pumped into the cavity 262. A simultaneous injection process may be used to form a plurality of projections 272. Although a single resin injection passage 272 is shown, multiple passages 272 may be employed. For example, three passages 272 may be used, where the passages 272 are located to inject resin at a bumper beam portion 274 of the cavity 262, a crush member portion 276 of the cavity 262, and a projection portion 278 of the cavity 262, respectively. Injection at the projection portion 278 may include the polymer resin 270 and a plurality of chopped reinforcing fibers (see discussion accompanying FIGS. 6A-6B). In FIG. 11D, the polymer resin 270 may be cured. In FIGS. 11E-11F, after curing is complete the mold 264 may be opened to release a cured component 280 having a plurality of projections 282.

With reference to FIGS. 12A-12F, a method of manufacturing a component (e.g., an upper component or a lower component) having a plurality of projections within a bumper and a flange on a crush member for an energy-absorbing structure according to certain aspects of the present disclosure is provided. The method may be similar to the method of FIGS. 11A-11F; thus, only the differences will be discussed in detail. In FIG. 12A, a fiber preform 290 having a flange portion 292 may be placed into a cavity 294 of a mold 296. In FIG. 12B, the mold 296 may be closed around the fiber preform 290.

In FIG. 12C, a polymer resin 298 may be pumped into the cavity 294. Simultaneous injection processes may be used to form a plurality of projections (see projections 316 on component 314 of FIG. 12F) and a flange (see flange 318 on component 314 of FIG. 12F). Although two resin injection passages 304 are shown, the use of two passages 304 is merely exemplary and other quantities of passages 304 may be used. For example, four passages 304 may be employed to inject resin at a bumper beam portion 306, a crush member portion 308, a projection portion 310, and a flange portion 312. In FIG. 12D, the polymer resin 298 may be cured. In FIGS. 12E-12F, after curing is complete the mold 296 may be opened to release a cured component 314. The cured component 314 may include a plurality of projections 316 and a flange 318. The flange 318 may be integrally formed with a crush member portion 320 of the component 314. More specifically, the crush member portion 320 may include a first end 322 and a second end 324 that is disposed opposite the first end 322. The flange 318 may be disposed at the second end 324 for fixing a crush member to a vehicle rail (see discussion accompanying FIG. 1). Although the component 314 is shown with both projections 316 and a flange 318, those skilled in the art would appreciate that a component may include crush member flanges alone without the bumper beam projections.

In certain aspects, the present disclosure provides another method of manufacturing a component (e.g., an upper component or a lower component) for an energy-absorbing structure. The energy-absorbing structure may be formed by compression molding. The compression molding process may use thermoplastic polymeric resins. Suitable thermoplastic polymeric resins may include precursors that are or can form acrylonitrile butadiene styrene (ABS), poly(methyl methacrylate) (PMMA), celluloids, cellulose acetate, cycloolefin copolymer (COC), ethylene-vinyl acetate (EVA), ethylene vinyl alcohol (EVOH), fluoroplastics (e.g., polytetrafluoroethylene (PTFE), fluorinated ethylene propylene (FEP), perfluoroalkoxy alkane (PFA), polychlorotrifluoroethylene (PCTFE), ethylene chlorotrifluoroethylene (ECTFE), ethylene tetrafluoroethylene (ETFE)), polyacetal (POM or Acetal), polyacrylonitrile (PAN), a polyamide (nylons), polyamide-imide (PAI), a polyaryletherketone (PAEK) (e.g., polyetherketone (PEK), polyetheretherketone (PEEK), polyetherketoneketone (PEKK)), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polycarbonate (PC), a polyhydroxyalkanoates (PHA), a polyketone (PK), a polyester, polyetherimide (PEI), a polyethersulfone (PES), a polysulfone (PSU), a polyethylenechlorinate (PEC), polylactic acid (PLA), polymethylpentene (PMP), polyphenylene oxide (PPO), polyphenylene sulfide (PPS), a polyphthalamide (PPA), polystyrene (PS), polytrimethylene terephthalate (PTT), a thermoplastic polyurethane (TPU), polyvinyl acetate (PVA), polyvinyl chloride (PVC), polyvinylidene chloride (PVDC), styrene-acrylonitrile (SAN), polycarbonate+acrylonitrile butadiene styrene mix (ABS+PC), polypropylene (PP), polyethylene (PE), and any co-polymers or combinations thereof.

At a first step of the compression molding process, a preconsolidated thermoplastic sheet may be cut to a desired shape. The preconsolidated thermoplastic sheet may include fiber, which may be continuous or discontinuous, and thermoplastic resin. The preconsolidated thermoplastic sheet may be rigid at room temperature. At a second step, the preconsolidated thermoplastic sheet may be pre-heated or warmed in an oven. At a third step, the preconsolidated thermoplastic sheet may be placed into a cavity of a mold. The mold cavity may also be heated. At a fourth step, the preconsolidated thermoplastic sheet is pressed into a desired shape of the upper component or the lower component. Lastly, at a fifth step, the component is de-molded.

The compression molding process may optionally include a formation of projections (see e.g., FIGS. 6A-7). The projections may be formed in an injection/compression process during the compression of the preconsolidated thermoplastic sheet (the fourth step). The projections include the thermoplastic resin and chopped fiber reinforcements.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An energy-absorbing structure for a vehicle comprising:
    a first component comprising a polymer and a first plurality of reinforcing fibers disposed therein, the first component comprising:
        a first bumper beam portion that is at least partially defined by a first wall; and
        a first crush member portion that is integrally formed with the first bumper beam portion, the first crush member portion that is at least partially defined by a second wall that projects from the first wall, and at least a first portion of the reinforcing fibers of the first plurality of reinforcing fibers continuously extending between the first wall and the second wall;
    a second component comprising the polymer and a second plurality of reinforcing fibers, the second component comprising:
        a second bumper beam portion that is at least partially defined by a third wall; and
        a second crush member portion that is integrally formed with the second bumper beam portion, the second crush member portion that is at least partially defined by a fourth wall that projects from the third wall, and at least a second portion of the reinforcing fibers of the second plurality of reinforcing fibers continuously extending between the third wall and the fourth wall, wherein the first component is joined to the second component, and the first wall and the third wall cooperate to define a bumper beam, and the second wall and the fourth wall cooperate to define a crush member, wherein a dimension of the crush member is greatest at a location adjacent to the bumper beam.

2. The energy-absorbing structure of claim 1, wherein the crush member further comprises:
    an interior compartment defined by the second wall and the fourth wall; and
    a transverse plate disposed within the interior compartment and fixed to at least one of the second wall and the fourth wall.

3. The energy-absorbing structure of claim 2, wherein the transverse plate defines a waveform shape having a plurality of peaks and a plurality of valleys.

4. The energy-absorbing structure of claim 1, wherein:
    the bumper beam further comprises an interior compartment defined by the first wall and the third wall; and
    a plurality of projections fixed to one of the first wall and the third wall and extending into the interior compartment.

5. The energy-absorbing structure of claim 4, wherein each respective projection of the plurality comprises the polymer and a plurality of chopped fibers.

6. The energy-absorbing structure of claim 1, wherein the crush member comprises a first end adjacent to the bumper beam and a second end that is opposite the first end, the second end comprising an outwardly-extending flange configured to engage a rail of the vehicle.

7. The energy-absorbing structure of claim 1, wherein the polymer includes one of:
    (i) a thermoplastic polymer selected from the group consisting of: a polyamide (PA), polyetheretherketone (PEEK), polyetherketone (PEK), a polyphenylene sulfide (PPS), a thermoplastic polyurethane (TPU), polypropylene (PP), co-polymers thereof, and combinations thereof; or
    a thermoset polymer selected from the group consisting of: a benzoxazine, a bis-maleimide (BMI), a cyanate ester, an epoxy, a phenolic (PF), a polyacrylate (acrylic), a polyimide (PI), an unsaturated polyester, a polyeurethane (PUR), a vinyl ester, a siloxane, co-polymers thereof, and combinations thereof.

8. The energy-absorbing structure of claim 1, wherein the reinforcing fibers of the first plurality of reinforcing fibers and the reinforcing fibers of the second plurality of reinforcing fibers are independently selected from the group consisting of: carbon fibers, glass fibers, basalt fibers, para-aramid fibers, meta-aramid fibers, polyethylene fibers, and combinations thereof.

9. The energy-absorbing structure of claim 1, wherein the crush member includes a first longitudinal portion and a second longitudinal portion, the second longitudinal portion being disposed between the first longitudinal portion and the bumper beam, the first portion being substantially cylindrical, and the second portion being a conical frustum.

10. An energy-absorbing structure for a vehicle comprising:
- a bumper beam comprising a first peripheral wall comprising a first polymer and a first plurality of reinforcing fibers distributed therein; and
- at least one crush member defining a longitudinal axis, having a second peripheral wall, and comprising a second polymer and a second plurality of reinforcing fibers distributed therein, the second peripheral wall projecting from the first peripheral wall along the longitudinal axis, wherein at least a portion of the reinforcing fibers of the first plurality of reinforcing fibers continuously extend from the first peripheral wall to the second peripheral wall, wherein a dimension of the at least one crush member is greatest at a location adjacent to the bumper beam.

11. The energy-absorbing structure of claim 10, wherein the first polymer and the second polymer are respectively thermoplastic polymers, each independently selected from the group consisting of: polyamide (PA), polyetheretherketone (PEEK), polyetherketone (PEK), polyphenylene sulfide (PPS), thermoplastic polyurethane (TPU), polypropylene (PP), and combinations thereof, and combinations thereof, and the reinforcing fibers of the first plurality of reinforcing fibers and the reinforcing fibers of the second plurality of reinforcing fibers are selected from the group consisting of: carbon fibers, glass fibers, basalt fibers, para-aramid fibers, meta-aramid fibers, polyethylene fibers, and combinations thereof.

12. The energy-absorbing structure of claim 10, wherein the first polymer and the second polymer are respectively thermoset polymers each independently selected from the group consisting of: benzoxazine, bis-maleimides (BMI), cyanate esters, epoxy, phenolic (PF), polyacrylates (acrylic), polyimide (PI), unsaturated polyester, polyeurethane (PUR), vinyl ester, siloxane, and combinations thereof, and the reinforcing fibers of the first plurality of reinforcing fibers and the reinforcing fibers of the second plurality of reinforcing fibers are independently selected from the group consisting of: carbon fibers, glass fibers, basalt fibers, para-aramid fibers, meta-aramid fibers, polyethylene fibers, and combinations thereof.

13. A method of manufacturing an energy-absorbing structure for a vehicle comprising:
- forming a first component and a second component, wherein each of the respective first component and second component includes a polymer and a plurality of reinforcing fibers, the first component comprises a first bumper beam portion that is at least partially defined by a first wall and a first crush member portion that is at least partially defined by a second wall that projects from the first wall, and the second component comprises a second bumper beam portion that is at least partially defined by a third wall and a second crush member portion that is at least partially defined by a fourth wall that projects from the first wall, at least a first portion of the reinforcing fibers of the plurality continuously extending between the first wall and the second wall of the first component, and at least a second portion of the reinforcing fibers of the plurality continuously extending between the third wall and the fourth wall of the second component; and
- joining the first component to the second component to form the energy-absorbing structure, wherein the first wall and the third wall cooperate to define a bumper beam and the second wall and the fourth wall cooperate to define a crush member, wherein a dimension of the crush member is greatest at a location adjacent to the bumper beam.

14. The method of claim 13, wherein the forming each of the respective first component and the second component includes high pressure resin-transfer molding (HP-RTM) and the forming further comprises:
- disposing a fiber preform in a mold cavity, wherein the fiber preform comprises the plurality of reinforcing fibers;
- injecting a thermoset polymer resin into the mold cavity;
- impregnating a plurality of voids in the fiber preform with the thermoset polymer resin; and
- curing the thermoset polymer resin and forming the respective first component and second component.

15. The method of claim 13, wherein the forming each of the respective first component and second component includes compression molding and the forming further comprises:
- preheating a preconsolidated polymeric sheet, wherein the preconsolidated polymeric sheet comprises a thermoplastic polymer resin and the plurality of reinforcing fibers;
- disposing the preconsolidated polymeric sheet in a mold cavity; and
- applying heat and pressure to the preconsolidated polymeric sheet to form the respective first component and second component.

16. The method of claim 13, wherein the reinforcing fibers of the plurality of reinforcing fibers are selected from the group consisting of: carbon fibers, glass fibers, basalt fibers, para-aramid fibers, meta-aramid fibers, polyethylene fibers, and combinations thereof.

17. The method of claim 13, wherein a first surface of the first wall and a third surface of the third wall are configured to form a first joint, and a second surface of the second wall and a fourth surface of the fourth wall are configured to form a second joint, each of the first joint and the second joint being independently selected from the group consisting of: a half lap splice joint, a bevel lap splice joint, a tabled splice joint, and a tongue and groove joint.

18. The method of claim 13, wherein the joining the first component and the second component comprises:
- applying an adhesive to at least one of a first surface of the first wall and a third surface of the third wall;
- applying the adhesive to at least one of a second surface of the second wall and a fourth surface of the fourth wall;
- contacting the first surface and the third surface to form the bumper beam;
- contacting the second surface and the fourth surface to form the crush member; and
- curing the adhesive.

19. The method of claim 18, wherein the joining the first component and the second component further comprises extending a first plurality of fasteners through the first wall and the third wall and extending a second plurality of fasteners through the second wall and the fourth wall.

20. The method of claim 13, wherein the joining the first component and the second component comprises extending a first plurality of fasteners through the first wall and the third wall and extending a second plurality of fasteners through the second wall and the fourth wall.

* * * * *